US006788504B2

United States Patent
Vanderkolk

(10) Patent No.: US 6,788,504 B2
(45) Date of Patent: Sep. 7, 2004

(54) MOBILE ELECTRIC POWER SUPPLY SYSTEM WITH DEACTIVATABLE GFCI PROTECTION

(75) Inventor: Richard John Vanderkolk, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 26 days.

(21) Appl. No.: 10/184,600

(22) Filed: Jun. 26, 2002

(65) Prior Publication Data

US 2004/0001292 A1 Jan. 1, 2004

(51) Int. Cl.[7] .................................................. H02H 3/16
(52) U.S. Cl. ........................................ 361/42; 361/45
(58) Field of Search .............................. 361/42, 43, 44, 361/45, 46, 47, 48, 49, 50, 114, 115

(56) References Cited

U.S. PATENT DOCUMENTS

| 2,733,661 A | | 2/1956 | Surgi ............................ 103/23 |
|---|---|---|---|
| 2,898,542 A | | 8/1959 | Wasko et al. .................. 322/90 |
| 3,213,321 A | | 10/1965 | Dalziel ......................... 317/18 |
| 3,872,355 A | * | 3/1975 | Klein et al. .................... 361/45 |
| 4,150,411 A | | 4/1979 | Howell ......................... 361/45 |
| 4,180,841 A | | 12/1979 | Engel ........................... 361/45 |
| 4,556,247 A | | 12/1985 | Mahaffey ................... 296/24 R |
| 5,353,185 A | * | 10/1994 | Bodkin ......................... 361/49 |
| 5,363,047 A | * | 11/1994 | Dresti et al. ................. 324/510 |
| 5,541,800 A | * | 7/1996 | Misencik ....................... 361/45 |
| 5,786,971 A | * | 7/1998 | Chan et al. .................... 361/42 |
| 5,917,686 A | * | 6/1999 | Chan et al. .................... 361/42 |
| 6,052,266 A | * | 4/2000 | Aromin ......................... 361/49 |
| 6,320,769 B2 | * | 11/2001 | Kurokami et al. ......... 363/56.03 |
| 6,476,509 B1 | * | 11/2002 | Chen et al. ................... 290/1 R |

* cited by examiner

Primary Examiner—Brian Sircus
Assistant Examiner—Danny Nguyen
(74) Attorney, Agent, or Firm—Christopher DeVries

(57) ABSTRACT

A mobile system for use in supplying AC power to different types of electrical loads including those having grounded neutrals as well as those having neutrals that are electrically isolated from ground. The system includes a GFCI circuit and can be switched between a first mode, in which the circuit provides AC power with ground fault protection for those loads having ungrounded (isolated) neutrals, and a second mode, in which the GFCI is deactivated so that it will not experience false tripping due to the intentional grounding of the neutral at the load. Both single and multi-phase systems are disclosed which can be incorporated into a vehicle, towed trailer, or portable generator. The system is useful for providing AC power to various types of electrical loads at locations where public utility power is not readily available.

35 Claims, 7 Drawing Sheets

MOBILE ELECTRIC POWER SUPPLY SYSTEM WITH DEACTIVATABLE GFCI PROTECTION

TECHNICAL FIELD

The present invention relates generally to mobile systems that supply alternating-current power, and further relates to ground fault circuit interrupter (GFCI) protection for such systems.

BACKGROUND OF THE INVENTION

Mobile electric power supply systems are often utilized to provide electric power at various recreation, campground, work, or construction sites where electric power from a public utility may not be readily available. These mobile systems can include portable generators such as are used residentially for backup power, wheeled trailers that can be releasibly hitched to automotive vehicles for higher wattage applications, as well as other generators integrated into a vehicle. See, for example, U.S. Pat. No. 2,733,661 issued Feb. 7, 1956 to Surgi; U.S. Pat. No. 2,898,542 issued Aug. 4, 1959 to Wasko et al.; and U.S. Pat. No. 4,556,247 issued Dec. 3, 1985 to Mahaffy. Once the mobile power supply system is moved to a particular site, one or more electrical loads can then be plugged into or otherwise electrically interfaced with the system and operated as needed. Such electrical loads may include, for example, power tools, commercial equipment, or residential appliances (such as in the event of use of the system as a backup generator).

Ground fault circuit interrupters (GFCIs) are used in utility power applications to protect against leakage currents that flow through ground rather than back through the source's neutral line. They are commonly found in residential settings where the utility power is used to operate household appliances. GFCI devices commonly include a differential current transformer, control circuit, and a circuit breaker device. The differential current transformer itself can be implemented as a toroidal core with the power line conductors being used as primaries and a secondary winding being connected to the control circuit that is, in turn, connected to the circuit breaker device. Ground fault or leakage currents are detected by the control circuit by sensing the difference in current magnitude between the outgoing current and the return current. When this difference, or imbalance, exceeds a preset threshold, the control circuit trips the circuit breaker device which open circuits the hot conductor.

More specifically, current sensing by the GFCI circuit can be implemented by threading the hot and neutral conductors through the core so that the vector sum of the currents in the hot conductor (or conductors for multi-phase) and the neutral conductor is normally zero. As a result, the magnetic flux generated by the current flowing through the hot conductor (or conductors for multi-phase) and the neutral conductor cancel each other out. Where no ground fault or leakage exists, the current flowing through the hot conductor(s) and the neutral conductor results in a net flux of zero. However, where current is able to follow a return path other than through the design conductor paths, such as through a ground path, the net current through the conductors will not be zero, thereby resulting in a net flux in the core that is sensed by the control circuit via the secondary winding. The control circuit compares the magnitude of this sensed current imbalance and trips the circuit breaker device if that magnitude exceeds the preset trip level. Examples of different GFCI circuits are disclosed in U.S. Pat. No. 3,213,321 issued Oct. 19, 1965 to Dalziel; U.S. Pat. No. 4,150,411 issued Apr. 17, 1979 to Howell; and U.S. Pat. No. 4,180,841 issued Dec. 25, 1979 to Engel.

For mobile electric power supply systems of the type noted above, the use of GFCIs can be problematic because some of the electrical loads powered by the mobile system may have grounded neutrals, while others may not. For example, in residential housing the neutral line is typically connected to earth ground via a metal wire and/or stake, whereas a typical power tool (which may or may not include a ground wire) will normally have an ungrounded neutral. For the power tools use, incorporating GFCI protection into the mobile system is desirable to protect against ground faults. However, if the mobile system is connected to the main circuit breaker box of a house for the purpose of delivering back-up electric power during a local power blackout, the circuit breaker device of the GFCI within the system may trip and cut off the electric power being delivered. This can occur because some electric current may be diverted from returning to the system via the neutral line conductor and is instead returned to the system via the legitimate electrically conductive grounding path. Thus, tripping may occur even in the absence of an undesired or non-legitimate electric current leakage path back to the system. This type of GFCI tripping is often referred to as false tripping or nuisance tripping. Further complicating this scenario is that whenever the GFCI trips in such a configuration, it can be difficult to determine whether the GFCI was (1) falsely tripped due to electric current returning along the legitimate electrically conductive grounding path, (2) legitimately tripped due to electric current returning along an undesired leakage path, or (3) tripped due to a combination of both.

Accordingly, it is a general object of the invention to provide a mobile electric power supply system that is capable of providing electric power with GFCI protection for an electrical load having an ungrounded neutral conductor and that is also capable of providing electric power for an electrical load having a purposely grounded neutral conductor without causing nuisance tripping of the GFCI circuit.

SUMMARY OF THE INVENTION

The present invention provides a mobile system for supplying electric power to an electrical load. The mobile system includes an electric power source, first and second receptacles coupled to the power source via two or more power line conductors, a ground fault circuit interrupter (GFCI) for ground fault protection of the second receptacle, and a switch device for use in switching power from the electric power source to either the first (unprotected) receptacle or the second (protected) receptacle. The GFCI is electrically connected to the power line conductors and has a circuit breaker element that is series-connected between the electric power source and the second receptacle. The switch device is electrically coupled between the electric power source and the first and second receptacles, and is connected in series with the GFCI such that current flowing through the circuit breaker element flows through the switch device. The switch device can be switched between a first state, in which the first receptacle receives power from the electric power source that is unprotected by the GFCI, and a second state, in which the second receptacle receives power from the electric power source that is protected by the ground fault circuit interrupter against a current imbalance in the power line conductors. Preferably, the switch device includes a manually activated switch for switching power between the first and second receptacles. With this configuration, a user can supply power to the first receptacle in which case the GFCI is either disabled or bypassed, or can supply power to the second receptacle which will then be ground fault protected by the GFCI. This allows the mobile system to be used for supplying power to loads having a grounded neutral without nuisance tripping of the GFCI while enabling the use of GFCI protection for those loads having an ungrounded neutral.

For the first receptacle used with loads having grounded neutrals, the GFCI can be defeated in various ways. For example, the switch device can be located downstream of the GFCI with the GFCI being disabled when the switch device is set to provide power to the first receptacle. In this way, the current flows through the GFCI, however, its internal control circuit is disabled from tripping the circuit breaker element. Alternatively, the switch device can be placed in circuit before the GFCI, with the GFCI being connected in series between the switch device and second receptacle while the power lines from the switch device to the first receptacle bypass the GFCI altogether.

The mobile system can be implemented as, for example, a portable generator, wheeled trailer, or automotive vehicle. Where a vehicle is used, the electric power source can comprise a vehicle battery and an inverter for generating single or multi-phase AC power. Preferably, the electric power source and GFCI are located in close proximity on the vehicle to minimize the length of non-GFCI protected power line runs. The receptacle can then be located onboard the vehicle remote from the GFCI circuit.

The switch device preferably includes either a manually activated switch to directly switch power between the first and second receptacles, or a lower amperage manually activated switch in combination with a relay that performs the power line switching. When used on a vehicle, the manual switch can be located either inside or outside the vehicle cabin space. Where single phase power is utilized, the switch device can be a single pole device and, where two-phase power is used, a double pole device will preferably be used.

The mobile system preferably includes an indicator circuit having an LED or other visual or audible warning that is activated when power is supplied to the non-GFCI protected first receptacle.

BRIEF DESCRIPTION OF THE DRAWINGS

Preferred exemplary embodiments of the invention will hereinafter be described in conjunction with the appended drawings, wherein like designations denote like elements, and wherein.

DESCRIPTION OF THE PREFERRED EMBODIMENT

The present invention provides a mobile electric power supply system that has the ability to provide GFCI protection when used with electrical loads having ungrounded neutrals and to deactivate the GFCI protection when used with electrical loads having grounded neutrals. This makes the system particularly useful for providing electric power in a variety of situations where electric power from a public utility is not readily available.

Figure 1:
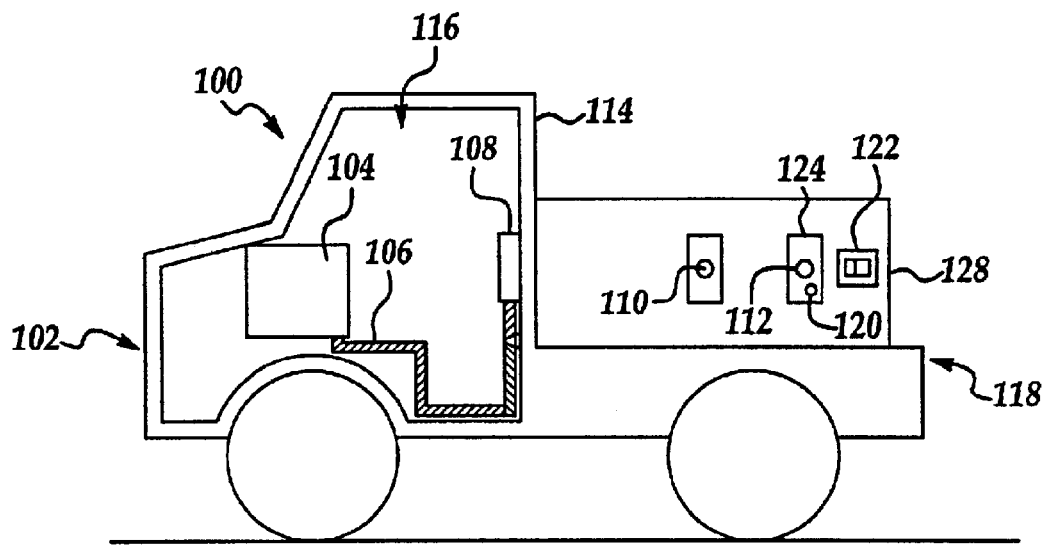
FIG. 1 illustrates a first embodiment of a mobile electric power supply system constructed according to the present invention.

FIG. 1 illustrates a first embodiment of a mobile system 100 according to the present invention. The system 100 includes an automotive vehicle 102 such as a truck having an electric power unit 104 electrically connected via a harness 106 to three AC receptacles, or receptacles, 108, 110, and 112. Vehicle 102 includes a cab 114 defining an enclosed cabin space 116 used by the vehicle operator and an open or enclosed bed 118. Receptacle 108 is located within the enclosed cabin space 116, while receptacles 110 and 112 are located outside the cabin space at the bed 118. The number of receptacles used in the illustrated embodiment is exemplary only and it will be appreciated that more or less receptacles could be used and can be located at any of a number of different locations onboard vehicle 102.

In the particular embodiment shown, the receptacle 112 is designated for use in conjunction with a first type of electrical load; namely, one having a grounded neutral conductor, and the other two receptacles 108 and 110 are each designated for use with a second type of electrical load; namely, one having an ungrounded neutral conductor. The first type receptacle 112 includes an indicator warning light that provides a visual warning of the non-GFCI protected state of the receptacle 112 through a window 120 on the receptacle's cover plate 124. Selection between the two designated types of receptacles is carried out using a switch device 122 that in this embodiment is located proximate the receptacles 110 and 112. To facilitate ease of access to receptacles 110 and 112 and to switch device 122, all three are mounted within the wall of a common housing 128 that is, in this particular embodiment, situated on the rear bed 118.

The switch device 122 can be manually switched into either one of two different positions to thereby provide power to either the first type (112) or second type (108, 110) receptacles. When in the first position, power from the electric power unit 104 is only supplied to the first type receptacle 112. At the same time, the visual warning light (188 in FIG. 2) is energized such that it shines through window 120 located proximate receptacle 112. When the switch device 122 is moved to its second position, power from the electric power unit 104 is only supplied to the second type receptacles 108 and 110. The warning light is concurrently extinguished.

Figure 2:
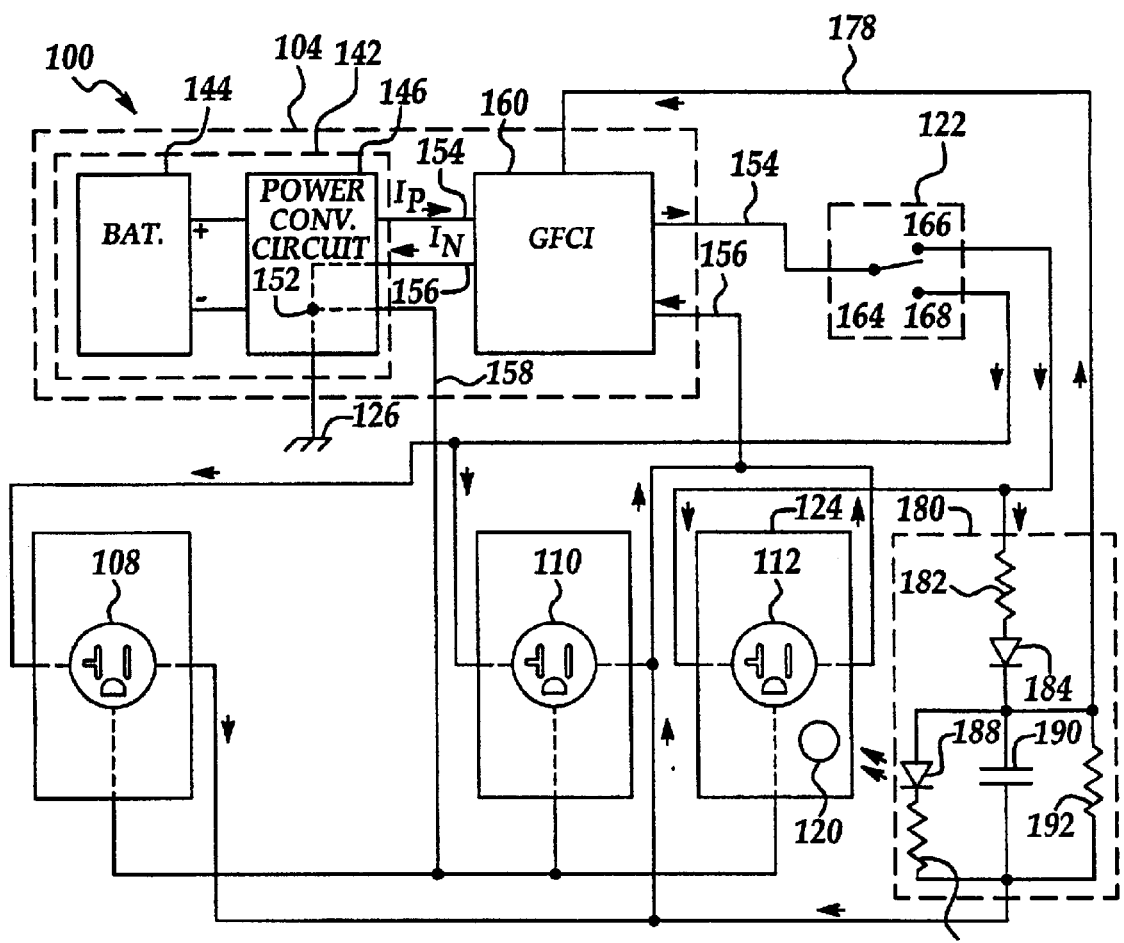
FIG. 2 is an electric circuit diagram of the mobile power supply system of FIG. 1.

FIG. 2 is a circuit diagram of the mobile system 100 illustrated in FIG. 1. As shown in FIG. 2, the electric power unit 104 includes both an electric power source 142 and a ground fault circuit interrupter (GFCI) 160. In general, alternating-current power produced by the electric power source 142 is supplied via the GFCI 160 and the switch device 122 to one or more of the receptacles 108-112 depending upon the state of the switch and the state of the GFCI. To disable the GFCI 160 when supplying non-GFCI protected power to the first type receptacle 112, the system includes a disable circuit 180 which uses the switched power supplied to the receptacle 112 to generate a disable signal that is provided back to the GFCI to disable tripping of its internal circuit breaker. This will be discussed in more detail subsequently.

The electric power source 142 includes both a direct-current (DC) voltage power source 144 and an electronic power conversion circuit, or inverter, 146. The DC source 144 itself can be the main vehicle battery. The DC voltage power source 144 is electrically connected to the inverter 146 which can be a conventional circuit that converts the DC electric power into single phase alternating-current power. As indicated in FIG. 2, the GFCI 160 can be implemented as a part of the electric power unit 104 with the GFCI being physically located in close proximity to the electric power source 142. This minimizes the length of non-GFCI protected power line runs. Furthermore, although the DC supply is shown as being part of the electric power source 142 and the overall electric power unit 104, it will be appreciated that it need not be physically located with the inverter 146 and GFCI 160.

The inverter 146 is electrically connected to the GFCI 160 via a pair of power line conductors that includes a phase line (hot) conductor 154 and a neutral line conductor 156. The neutral conductor or power line 156 is electrically connected to the electronic power conversion circuit 146 such that it is connected to a circuit node 152 in the electronic power conversion 146. As shown, node 152 is electrically connected to a chassis ground 126 of the automotive vehicle. The neutral line 156 is also connected to the neutral terminals of all three receptacles 108–112. Each receptacle 108–112 includes a ground connection that is also commonly electrically connected to chassis ground 126 via a ground conductor 158. The switch device 122 is connected downstream of the GFCI to the hot conductor 154 in such a manner that it can be switched between the two types of receptacles. Thus, the hot power line 154 and the neutral power line 156 together are capable of supplying AC electric power to either the one first type receptacle 112 or to both of the second type receptacles 108 and 110 as permitted and dictated by the GFCI 160 and the switch device 122.

The hot power line 154 coming from GFCI 160 is electrically connected to a movable contact 164 of the switch device 122. The switch device illustrated in this embodiment is a single-pole, double-throw (SPDT) type switch which, in addition to the movable contact 164, includes two fixed contacts 166 and 168. The two positions of the switch 122 correspond to two different states of the movable contact 164, with it being shorted to the first fixed contact 166 when in the first position and to the second fixed contact 168 when in the second position. The fixed contact 166 is electrically connected to both the first type receptacle 112 and the disable circuit 180. The other fixed contact 168 is electrically connected to the second type receptacles 108 and 110. Given such a configuration, when the switch device 122 is placed into the first position such that the moveable contact 164 electrically shorts to contact 166, AC power from the electric power source 142 is thereby supplied to both the receptacle 112 and the disable circuit 180 which, in turn, disables the GFCI operation so that any electrical load connected to the receptacle 112 and having a grounded neutral will not trip the GFCI 160. On the other hand, when the switch device 122 is placed into the second position such that the moveable contact 164 electrically shorts to contact 168, the AC power is instead supplied to receptacles 108 and 110. Since the power is now removed from the disable circuit 180, the GFCI is re-enabled and operable to provide ground fault protection of the receptacles 108 and 110.

The disable circuit 180 receives power supplied to the first type receptacle 112 and includes a half wave rectifier in the form of a diode 184 and capacitor 190. The circuit also includes a resistive voltage divider formed by resistors 182 and 192 which provide capacitor 190 with a rectified voltage level suitable for use as the disable signal provided to GFCI 160. This disable signal is provided to a data input of the GFCI via a signal line 178. The disable circuit also functions as an indicator light circuit and, for this purpose, includes a light source, such as an LED 188 that is connected across capacitor 190. Resistor 194 limits the current through LED 188 to the proper value. This LED is located at the receptacle 112 so that it provides illumination through the window 120. In this manner, the indicator light 188 is capable of signifying when the switch device 122 is in the first position and the GFCI 160 is electrically disabled.

Figure 3:
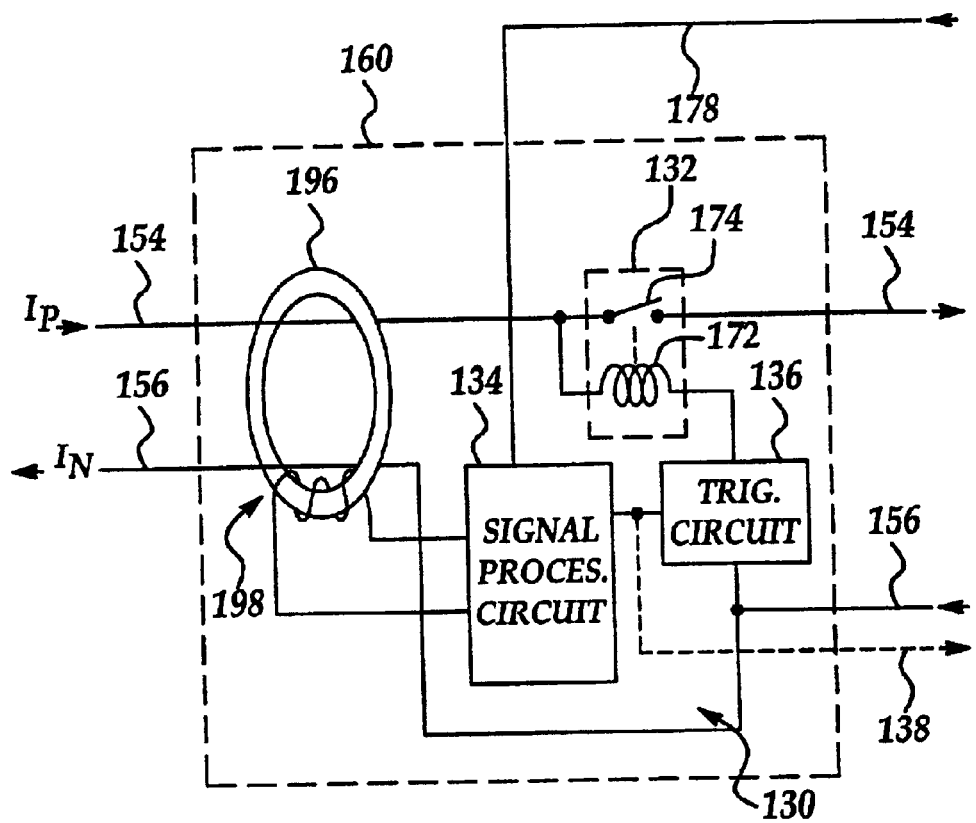
FIG. 3 is an electric circuit diagram of the GFCI utilized in the circuit of FIG. 2.

GFCI 160 is shown in greater detail in FIG. 3. In general, GFCI 160 has an output on which it provides a trip signal in the event of the GFCI detecting a sufficiently large current imbalance on the power lines. This trip signal can be used either by the GFCI 160 itself or externally to interrupt current flow over the power lines to thereby provide ground fault protection of receptacle 112. GFCI 160 includes, first of all, a differential current transformer having a toroidal core 196 and an electrically conductive secondary winding 198 wound about the core 196. The hot power line 154 and the neutral line 156 act as primaries for the current transformer and are thus both threaded (i.e., routed) through the toroidal core 196. Although not shown, each of the conductors 154 and 156 can include one or more turns wound on the core. GFCI 160 also has a control circuit 130 that provides the trip signal output that, in the embodiment shown, is connected to a circuit breaker device 132 in the form of a relay. Control circuit 130 includes a signal processing circuit 134 and a trigger circuit 136. The two ends of the secondary winding 198 are electrically connected to the signal processing circuit 134 which monitors the secondary for an imbalance between the two primaries 154 and 156. Signal processing circuit 134 has a data input that is electrically connected to the disable circuit 180 (via the conductor 178) to receive a disable signal when appropriate and is also connected to the trigger circuit 136 to control activation of the relay 132 via the trigger circuit. Relay 132 includes a coil 172 and a switch contact 174 that is in series with the hot power line 154. Switch contact 174 thus acts as a circuit breaker element that can be opened or closed depending upon the energization of coil 172. Coil 172 is connected between the trigger circuit 136 and the hot power line 154 at the input end of the relay. In this way, the signal processing circuit 134 controls activation of the coil 172 via the trigger circuit 136. The relay 132 can be implemented in various ways, such as by using a normally closed switch contact 174, a normally open switch contact 174, or as a latching relay, and the incorporation and use of these different configurations will be known to those skilled in the art. As will be understood, when signal processing circuit 134 detects an imbalance in current between the primaries 154 and 156 that is above a predetermined threshold value (e.g., 5 mA), and where no disable signal on line 178 is present, it activates trigger circuit 136 which operates relay 132 (by either energizing or de-energizing the coil 172) to thereby move the switch contact 174 to an open-circuit position, thereby preventing current flow through the GFCI on line conductor 154. This open circuit condition can then be maintained in a latched state until reset by the operator using, for example, a manual reset button located at the GFCI. The latching and resetting of GFCI can be done in various ways that are known in the art.

In lieu of the circuit breaker 132, other techniques can be used to interrupt current flow through the power lines using the output of the GFCI's control circuit. In particular, the trip signal on output 138 of the signal processing circuit 134 can be routed back to the inverter 146 and used there to interrupt or disable its operation. In this case, neither relay 132 nor its trigger circuit 136 would be necessary. As will be well known to those skilled in the art, interruption of the inverter can be accomplished in any of a number of different ways, such as by shutting off the main power switching transistors. The construction and operation of vehicle inverters, whether for electric vehicle motor operation or otherwise, is well known to those skilled in the art, and the control of a vehicle inverter using its power switching transistors is also known, as exemplified in U.S. Pat. No. 6,262,896, the complete disclosure of which is hereby incorporated by reference.

The use and operation of the mobile power supply system 100 will now be described. Once the system 100 is located on site where the electric power is needed, a determination is first made by the operator as to whether the load that will be run by the system is of either the first type (grounded neutral) or second type (ungrounded neutral). Where the load's neutral is grounded such as, for example, where the load is a residential house circuit connected to power supply system 100 via the house's main circuit breaker box, the operator moves the switch 122 into the first position to electrically connect the movable switch contact 164 to the fixed contact 166, thereby supplying AC power from the hot power line 154 to the receptacle 112. This power is also supplied to disable circuit 180 where positive half-wave electric current pulses electrically charge up the capacitor 190 such that a relatively stable and continuous DC electric current is provided both to the signal processing circuit 134 of the GFCI 160 (via the conductor 178) and to the warning indicator LED 188. This active high disable signal is used by the signal processing circuit 134 to disable the control circuit 130 so that switch contact 174 will remain closed regardless of the existence of a current imbalance between the conductors 154 and 156. This disabling can be accomplished in a number of different ways that will be known to those skilled in the art. For example, where the signal processing circuit 134 is designed to provide an active high signal to the trigger circuit 136 to cause it to open the switch contact 174, the signal received via line 178 on the GFCI's data input can be inverted and ANDed with the trip signal output of the current imbalance threshold comparison carried out by signal processing circuit 134 so that the active high trip signal that would normally be sent directly to the trigger circuit 136 would only pass through the AND gate (and on to the trigger circuit) when the disable signal is not present.

Where the trip signal from the GFCI 160 is used to interrupt operation of the inverter 146 rather than the circuit breaker 132, it can be disabled in the same manner as described above (e.g., by ANDing it with the inverted disable signal received via conductor 178). In this regard, it is worth noting that, although the GFCI 160 is shown in the figures as being separate from electric power source 142, it will be understood that it can be incorporated into the electric power source 142 with the disable signal then being provided to the electric power source for use by the internal GFCI. The GFCI can be incorporated into the inverter 146 itself and, as described above, used to shut down the inverter operation when a current imbalance is sensed and no disable signal is present.

Once the operator observes that the LED 188 has been illuminated, the system 100 is ready for use in supplying non-GFCI protected power via receptacle 112. Using this embodiment of the present invention, the load should be plugged in after switching the switch 122 to the first position and the load should have a main switch or breaker that is held open-circuit until the connection to the receptacle is made. For example, in the case where the receptacle 112 is connected to the main circuit breaker panel of a house or building, a main circuit breaker switch (not shown) within the panel may be activated so AC electric power provided by the system 100 via the receptacle is made available to operate various electrical loads within or about the house. AC electric current provided and used to operate the various electrical loads associated with the house is circuitously returned to the electronic power conversion circuit 146 of the electric power source 142 of the system 100 primarily via the house breaker box, the receptacle 112, and the neutral line 156. Any significant amount of electric current that may circuitously return to the electronic power conversion circuit 146 via either the ground conductor 158 or the chassis ground 126 will not trip the GFCI 160 since it has now been deactivated. In this way, the system 100 effectively prevents false and nuisance tripping of the GFCI 160 when the system 100 is electrically interfaced with the first type of electrical load having a grounded neutral. Note that the built in GFCI receptacles in the house will still function formally to protect users in an adverse environment from hazardous electric shock.

If, on the other hand, the electrical load at the site is of the second type having a designated neutral conductor that is electrically isolated from ground, such as, for example, an electric power drill, the operator moves the switch 122 into the second position, thereby connecting the movable switch contact 164 to the fixed contact 168. This connects the hot power line 154 to the receptacles 108 and 110, leaving receptacle 112 unpowered. Furthermore, since power is no longer supplied to the disable circuit 180, LED 188 is extinguished and no disable signal is provided to the GFCI via signal line 178. As a result, the GFCI 160 is in a fully enabled state and stand ready to trip if a sufficient current imbalance is detected by the signal processing circuit 134.

Once the switch has been moved to the second position, the system 100 is ready for use in supplying GFCI protected power via receptacles 108 and 110. Although not shown, this powered state of the receptacles 108 and 110 can be indicated in various ways including a diode or other light source at the receptacles or at another location such as within the vehicle cab 114. In this regard, the receptacles 108–112 can each be specifically labeled to identify the type of receptacle (GFCI protected or not) and/or the type of electrical load to which it should be connected (grounded neutral or not). The load can be connected to the receptacles 108 and 110 prior to switching the switch 122 to the second position, or can be plugged in afterwards, especially for loads such as power tools that have a on-off switch that can held switched off until the connection to the receptacle is made. Ideally, the AC electric current used to operate the load is delivered and returned to the inverter 146 via only the hot and neutral power lines 154 and 156 connected to the receptacles 108 and 110. In this case, the differential current transformer of the GFCI 160 will not sense a current imbalance between the AC electric phase current $I_p$ flowing through the hot line conductor 154 and the AC electric neutral current $I_n$ flowing through the neutral line conductor 156. and electric power continues to be provided to the load without interruption.

If, while the switch 122 is in the second position, a leakage condition arises wherein an undesired current path forms between the load and the system 100 such that more than an insignificant amount of electric current is diverted from properly returning to the power source 142 via the conductors 154 and 156, the GFCI 160 will function and effectively cut off electric power to the load. More particularly, in the case of a current leakage condition where current to the load flows through either the ground path 158 or the chassis ground 126, the resultant electric current imbalance between the current $I_p$ in the hot power line 154 and the current $I_n$ in the neutral line 156 produces a net flux in the toroidal core 196, resulting in an electric signal being induced in the secondary winding 198 that is representative of the amount of current imbalance. This signal from the transformer secondary 198 is provided to the signal processing circuit 134 which compares the magnitude of this signal to a predetermined threshold representative of a desired trip level. This threshold can be (but need not be) permanently stored in the GFCI 160 and can be set to correspond to any desired level of current imbalance such as, for example, 5±1 milli-amps (mA). This trip signal may also be determined by a combination of current imbalance and time duration.

If the electric current imbalance exceeds the pre-stored predetermined trip level, the signal processing circuit 134 will then generate the trip signal to interrupt current flow which it is able to do since no disable signal is present. Again, this interruption can be done using the trigger circuit 136 and relay 132, or by turning off the switching transistors in the inverter 146. The trigger circuit 136 can be implemented in various ways known to those skilled in the art and can be designed to be used in conjunction with a relay having normally-open, normally-closed, or latching contacts. The triggering circuit 136 can, for example, include a triggering device such as a thyristor or, more specifically, a silicon-controlled rectifier (SCR). Where a relay 132 having normally-closed contacts are used, the trigger circuit 136 can be designed so that, upon receiving the triggering signal, it enters into a conduction mode wherein AC electric current is permitted to pass from the hot power line 154, through the coil 172 of relay 132, through the trigger circuit 136, and to the neutral line 156. Consequently, the coil 172 is energized and pulls the movable contact 174 from its normally-closed position into an open-circuited position, thereby creating a break or open circuit condition in the phase line conductor 154. As a result, AC electric phase current $I_p$ is prevented from being made available to the electrical load that is plugged into either of the receptacles 108 or 110. In this way, the GFCI 160 is effectively able to cut off electric power to any plugged-in electrical load.

In this first embodiment, the electric power source 142 is preferably capable of providing 60 hertz (Hz) and 115 volt AC power to loads that are connected to the system 100. In addition, the receptacles 108–112 are each preferably rated to supply up to 20 amperes (A) of AC electric current at this voltage. Of course, other voltages and current ratings could be utilized depending upon the intended use of the system. Furthermore, it is to be understood that the battery or batteries of the DC voltage power source 144 as well as the electronics of the power conversion circuit 146 can, as desired, be a wholly independent system or can be shared and/or integrated with the original power and electrical system of the automotive vehicle 102 at varying levels of integration.

It will be appreciated by those skilled in the art that other circuit configurations can be used as well to provide either non-GFCI protected power to the receptacle 112 or GFCI protected power to the other receptacles 108 and 110. For example, the positions of the switch device 122 and GFCI 160 could be exchanged so that the switch device is connected directly to the power line 154 coming from the power source. In this configuration, the power line running from the fixed contact 168 of the switch device can be connected to the receptacles 108 and 110 via the GFCI 160 so that ground fault protection is provided. On the other hand, the power line running from the fixed contact 166 of the switch device can be connected directly to the receptacle 112 so that the GFCI 160 is bypassed altogether when supplying power to receptacle 112. A special GFCI circuit design incorporating the disable capability is then not needed and the disable circuit 180 can be reduced down to providing only the indicator light function.

Lastly, despite the particular configuration of the first embodiment of the system 100 as depicted in FIGS. 1–3, it is to be understood that the system can include any number of first type electrical load receptacles as well as any number of second type electrical load receptacles. In addition, these receptacles, along with the electric power source 142, the GFCI 160, the switch device 122, and the disable circuit 180, may each be situated generally anywhere on board the automotive vehicle 102, whether inside or outside of the cabin space 128 within the automotive vehicle 102. Furthermore, instead of a single automotive vehicle 102, the mobile power supply system 100 can be incorporated into either a single trailer, capable of being releasably hitched and towed by an automotive vehicle, or into both an automotive vehicle and a trailer releasably hitched thereto such that the trailer is capable of being towed by the automotive vehicle. In this latter suggested embodiment, the power source 142, the GFCI 160, and other circuitry, as well as the two types of receptacles can be distributed between the automotive vehicle or the trailer. Further, although the various devices are described as physically separate entities, they in fact may be integrated together to varying degrees. Apart from a vehicle or trailer application, the mobile power supply system can also be implemented as portable equipment (whether wheeled or not) such as, for example, a gasoline-powered household backup generator having an alternator instead of an inverter.

Figure 4:
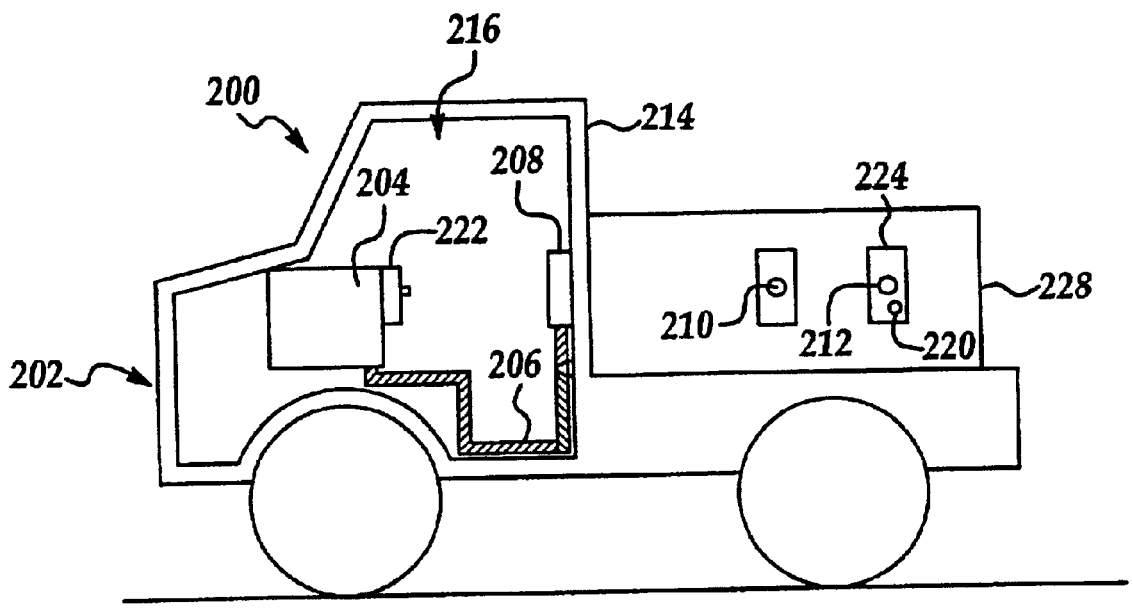
FIG. 4 illustrates a second embodiment of a mobile electric power supply system constructed according to the present invention.
Figure 5:
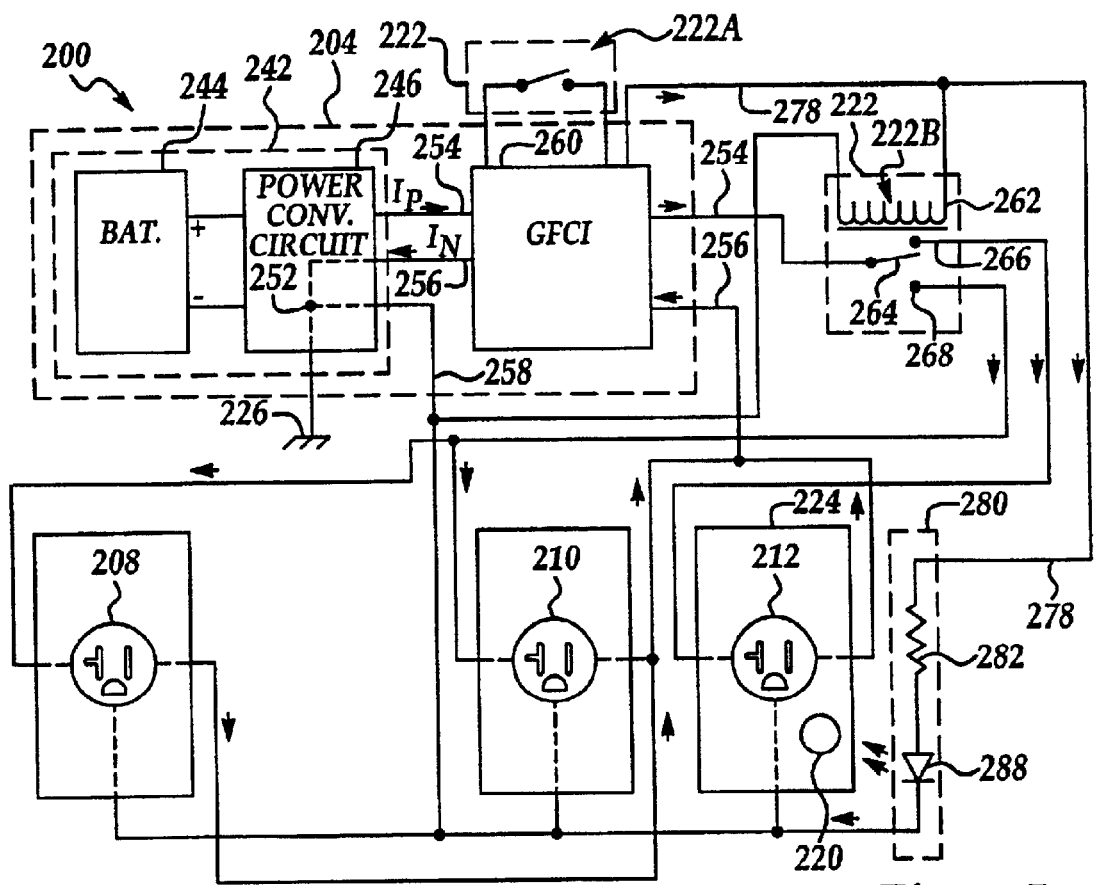
FIG. 5 is an electric circuit diagram of the mobile power supply system of FIG. 4.
Figure 6:
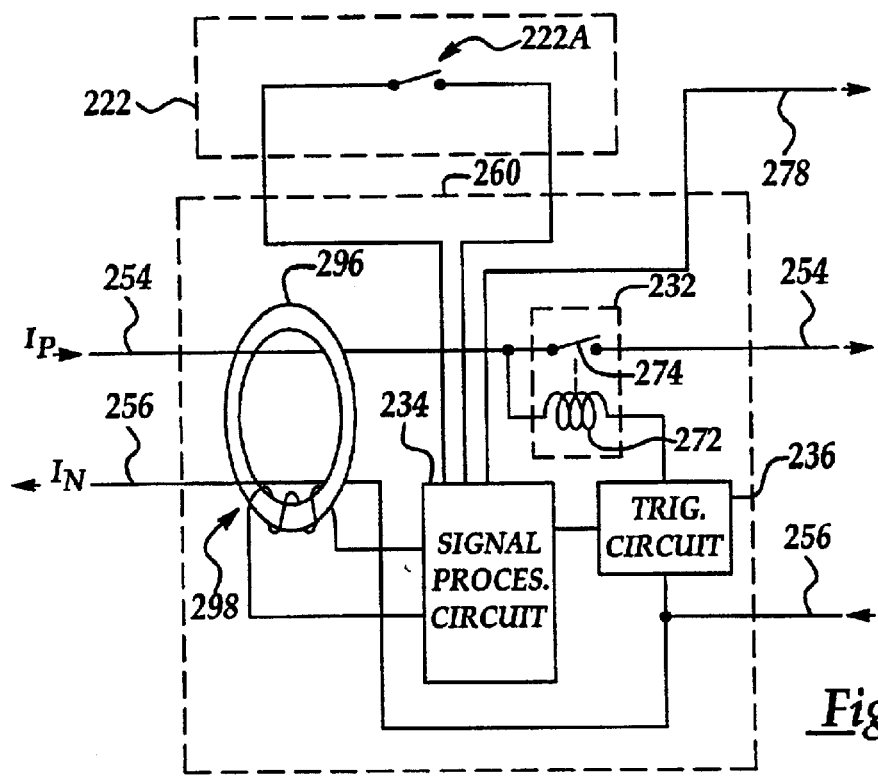
FIG. 6 is an electric circuit diagram of the GFCI utilized in the circuit of FIG. 5.

Referring now to FIGS. 4–6, there is shown a second embodiment 200 of a mobile electric power supply system constructed in accordance with the present invention. For purposes of comparison and convenience, features included within the second and subsequent embodiments that are identical, similar, or analogous to structural features within the first embodiment have numerical designations that include the same last two digits as their corresponding structural element in the first embodiment.

In general, the second embodiment of the mobile electric power supply system 200 is similar to the first embodiment except that the SPDT switch comprising the switch device 122 has been replaced with a lower amperage single-pole, single-throw (SPST) switch 222A in combination with a single-pole, double-throw (SPDT) relay 222B which together comprise the switch device 222 of the second embodiment. As shown, the switch 222A is connected to GFCI 260 with one end being connected to a data input of the GFCI and the other to a voltage source node within the GFCI so that a voltage signal can be supplied to the data input when the switch 222A is closed. It will be understood that, in lieu of a voltage signal, any detectable electrical characteristic that changes upon closure of the switch can be used to provide the data input with an indication that the state of the switch has been changed between its opened and closed positions.

As will be appreciated by those skilled in the art, the first embodiment involves directly switching the hot power line between the two types of receptacles with the disable signal being supplied indirectly to the GFCI's data input (via signal line 178) based on the supply of power to the first type receptacle 112. On the other hand, the second embodiment involves providing a disable signal directly to the GFCI via the switch 222A with the GFCI generating a control signal that is supplied via signal line 278 to the relay 222B to effect switching of the power lines between the different receptacles. Thus, as shown in FIG. 6, the switch 222A connects to the signal processing circuit 234 to provide it with the disable signal upon closure of switch 222A, with the signal processing circuit 234 being operable to disable triggering of the circuit breaker device (relay) 232 and to generate the control signal used to energize relay 222B via conductor 278. For this purpose, relay 222B includes a coil 262 connected between node 278 and the ground 252. Relay 222B has a moveable switch contact 264 that can be switched to connect to either of a first contact 266 or a second contact 268. In its normally-closed position, the movable contact 264 is connected to the second fixed contact 268, but can be switched instead into contact with the normally-open fixed contact 266 upon energization of the coil 262.

The signal line 278 used to energize the relay 222B is also connected to an indicator circuit 280 which includes a current-limiting resistor 282 in series with an LED 288 that is oriented to provide signal illumination through window 220 on the cover plate 224.

For this second embodiment, where a first type of electrical load (grounded neutral) is to be connected to the system 200, the operator switches the switch 222A into a first position in which the switched is closed; that is, the switch contacts are closed thereby defining a conductive path through the switch. This provides a disable signal to the signal processing circuit's data input, thereby disabling the trigger circuit 236 and relay 232 so that the GFCI protection is deactivated. The signal processing circuit 234 simultaneously generates a control signal on conductor 278 which energizes coil 262 moving the switch contact 264 from its normally-closed position to the normally-open fixed contact 266, thereby supplying power from the hot power line 254 to the first type receptacle 212 only. The control signal on line 278 also activates LED 288 to provide a visual indication of the powered status of receptacle 212.

Where a second type electrical load (ungrounded neutral) is to be connected to the system 200, the operator places the switch 222A into a second position in which the switch contacts are open-circuited. No disable signal is therefore received on the GFCI's data input, in which case the GFCI 260 operates as normal, monitoring for a current imbalance and generating a trip signal which is used to either shut down the inverter 246 operation or to open-circuit the movable contact 274 of the circuit breaker device 232 when a sufficiently large imbalance is detected. No signal is supplied to the conductor 278 so that neither the relay 222B nor the LED 288 is activated. In this case, the movable contact 264 of relay 222B is in its normally-closed position in contact with the fixed contact 268. Thus, power is no longer supplied to the receptacle 212, but rather to the second types receptacles 208 and 210.

In addition to the differences noted above between the first two embodiments, another difference from the standpoint of an operator is that the switch 122 in the first embodiment is located outside of the cabin of the automotive vehicle 102 (see FIG. 1) while switch 222A of the second embodiment is located inside the cabin of the automotive vehicle 202 (see FIG. 4). Nonetheless, in either embodiment the switch can be placed at any desired location on the vehicle.

Figure 7:
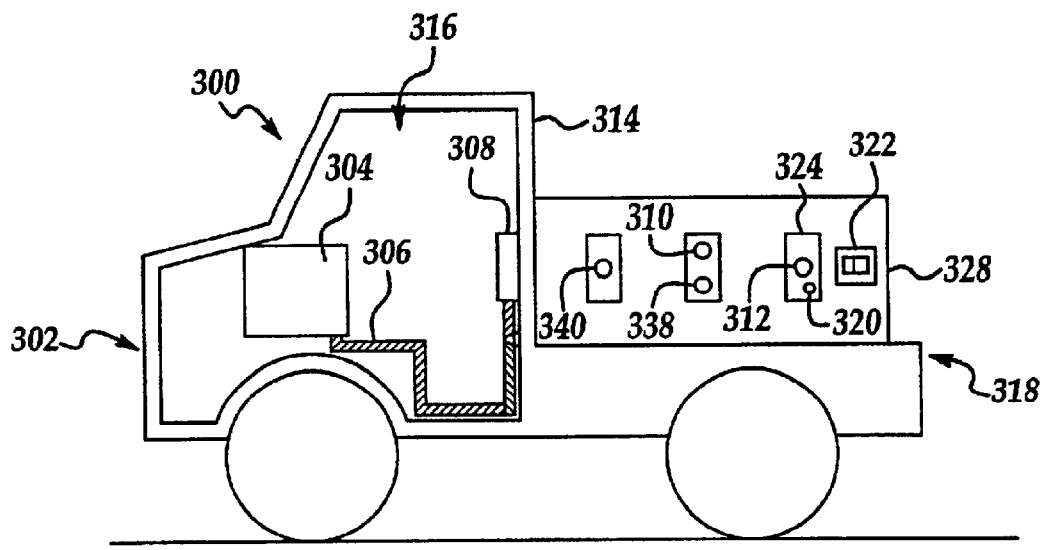
FIG. 7 illustrates a third embodiment of a mobile electric power supply system constructed according to the present invention.
Figure 8:
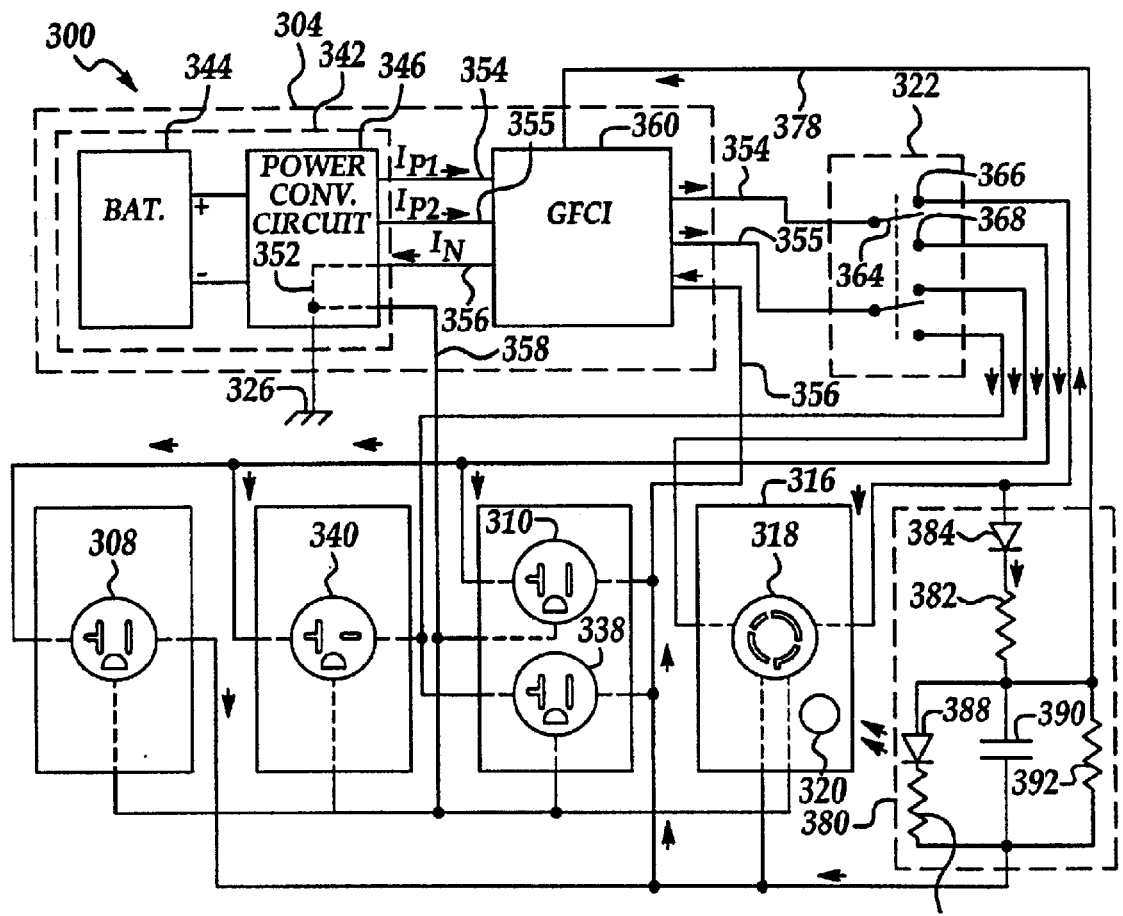
FIG. 8 is an electric circuit diagram of the mobile power supply system of FIG. 7.
Figure 9:
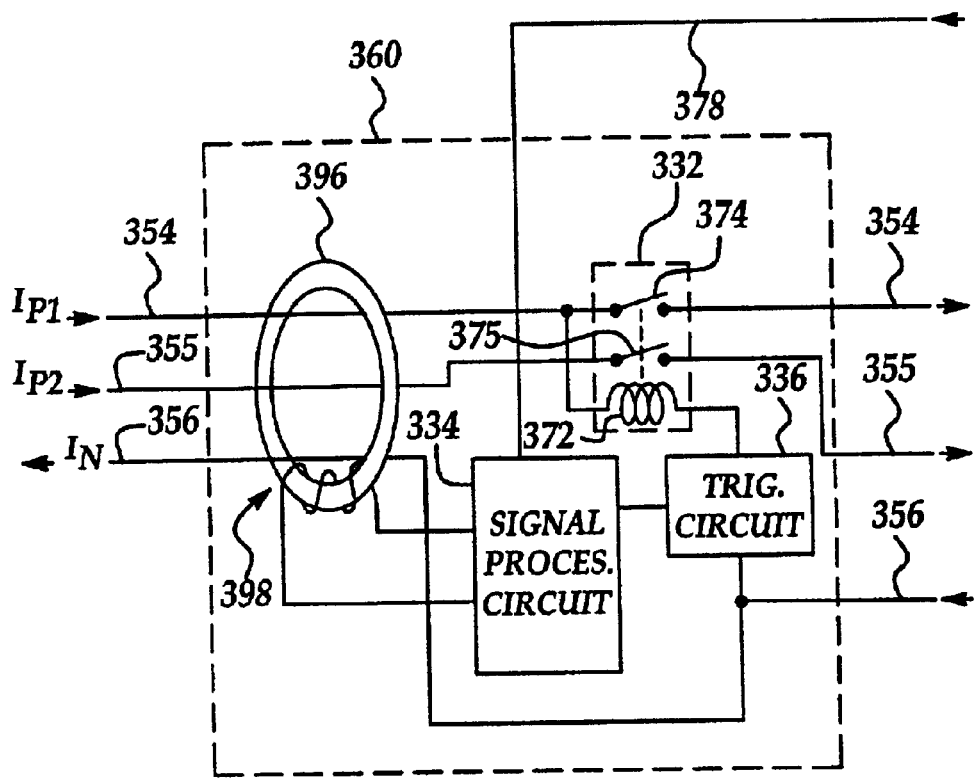
FIG. 9 is an electric circuit diagram of the GFCI utilized in the circuit of FIG. 8.

FIGS. 7–9 illustrate a third embodiment 300 of a mobile power supply system constructed according to the present invention. In general, the third embodiment 300 is similar in both structure and operation to the first embodiment, except that it provides both single and two-phase AC operating power. For this purpose, the system 300 has both a first phase line (hot) conductor 354, along which a first phase of AC current $I_{p1}$ is conducted, and also a second phase line (hot) conductor 355, along which a second phase of AC current $I_{p2}$ is conducted. The first and second hot power lines 354 and 355 are 180 degrees out of phase with each other so that they can be used individually with neutral line 356 to provide 115 VAC power or together to provide 235 VAC power.

To accommodate both hot power lines 354 and 355, the relay 332 of the GFCI 360 is implemented as a DPST relay with both the first movable contact 374 as well as a separate movable contact 375 connecting a second set of relay terminals. In this way, whenever GFCI 360 is tripped, both hot power lines 354 and 355 are open-circuited. In a similar manner, the switch device 322 can be implemented as a double pole, double throw switch with the separate poles being used for the two separate hot power lines 354 and 355. The provision of two-phase power also enables the power supply system to be provided with additional types of receptacles to accommodate various different types of two-phase loads. For example, the first type (non-GFCI protected) receptacle 312 can be a 3-pole, 4-wire "locking" type receptacle. This locking type receptacle 312 is useful for backup house power where the house includes both a grounded neutral and various electrical loads requiring different levels of supply voltage. Moreover, different combinations of the second type of receptacle (for ungrounded neutrals) can be provided as well. For example, in addition to receptacles 308 and 310 which use only the one hot power line 354 along with the neutral line 356, there can also be receptacles such as receptacle 338 which uses the other phase of power (i.e., power line 355), as well as a 235 VAC receptacle 340 that uses both phases of power line 354 and 355, but no neutral. This can be used for operating such things as an air compressor, welder, table saw or other tools with ungrounded neutrals which may require the higher voltage power. Moreover, multiple receptacles can be located together on a single cover plate, as shown with receptacles 310 and 338. For this two-phase embodiment, when the switch 322 is in its second position such that GFCI 360 is operable to provide ground fault protection to the receptacles 308, 310, 338, and 340, the signal processing circuit monitors the current through the power lines 354-356 and controls the circuit breaker element.

Figure 10:
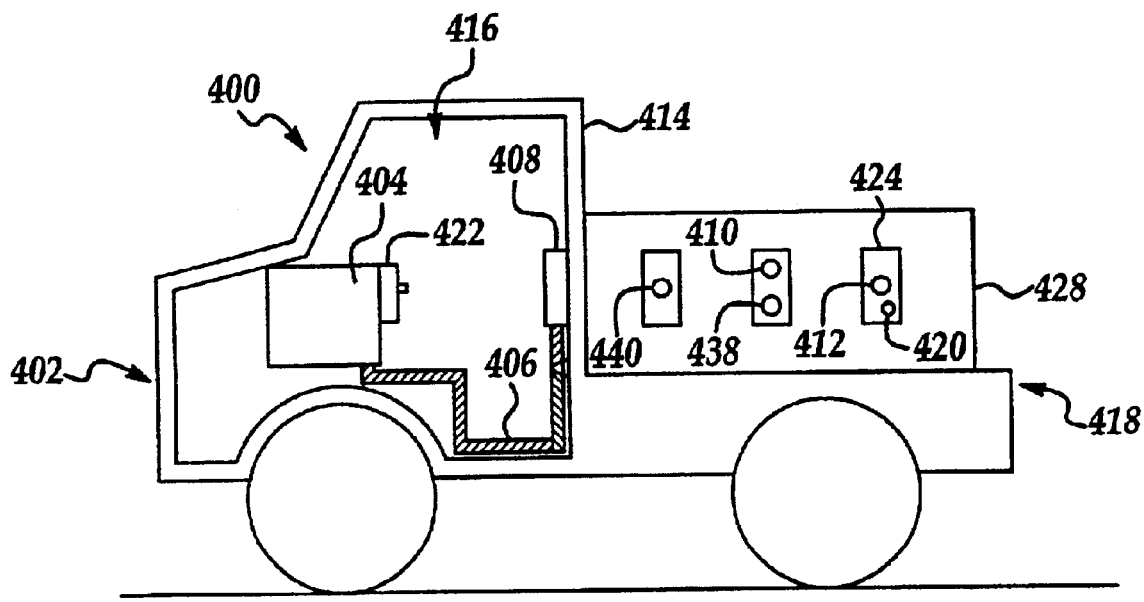
FIG. 10 illustrates a fourth embodiment of a mobile electric power supply system constructed according to the present invention.
Figures 11, 12:
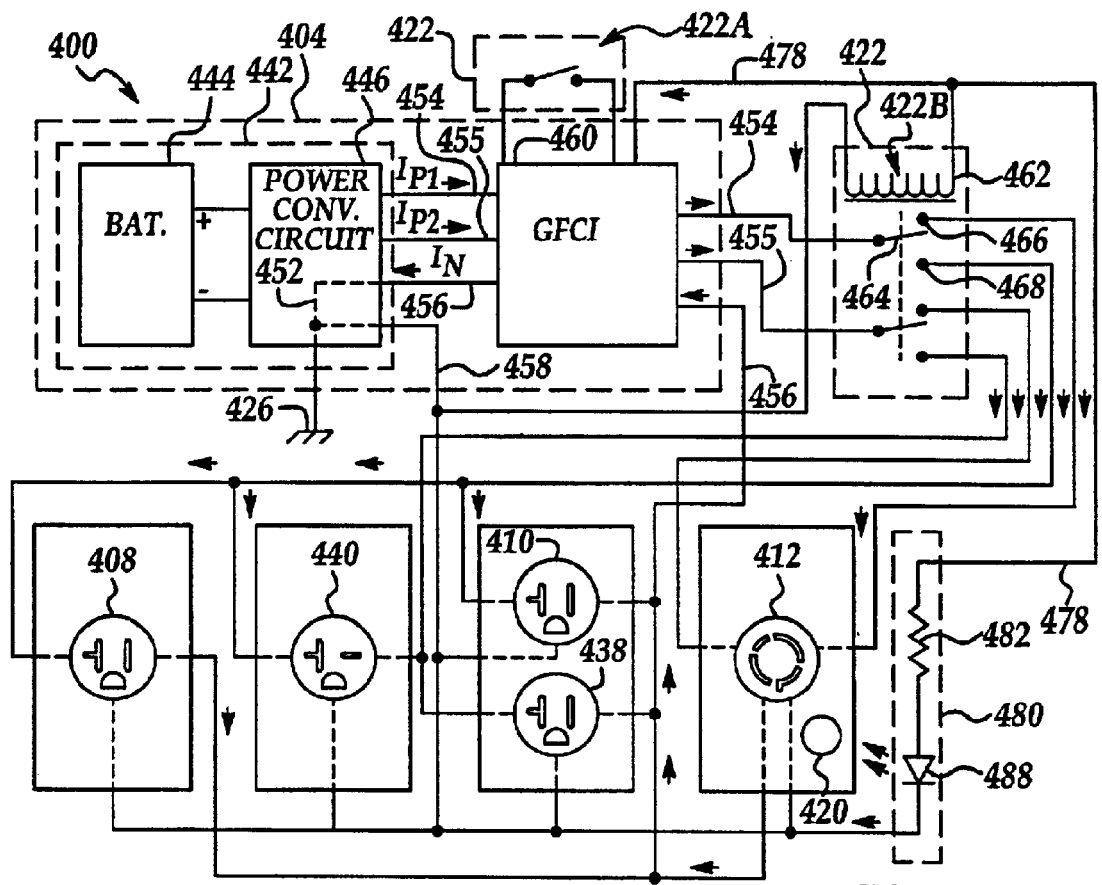
FIG. 11 is an electric circuit diagram of the mobile power supply system of FIG. 10.
FIG. 12 is an electric circuit diagram of the GFCI utilized in the circuit of FIG. 11.

FIGS. 10–12 illustrate a fourth embodiment 400 of a mobile power supply system constructed according to the present invention. In general, this fourth embodiment 400 is a combination of both the second and third embodiments. For this purpose, the switching device 422 comprises both a switch 422A and a DPDT relay 422B. The switch is connected to GFCI 460 as described above in connection with the second embodiment 200 so that, when the switch 422A is closed, it provides a disable signal directly to the signal processing circuit 434 within GFCI 460. This signal processing circuit in turn disables the DPST circuit breaker relay 432 within the GFCI and also generates a control signal on line 478 to energize the coil 462 of relay 422B. This permits switching of the two phase power lines 454 and 455 between the second type receptacles 408, 410, 438, and 440 (designated for loads with ungrounded neutrals) and the first type receptacle 412 (designated for electrical loads with grounded neutrals). The second type receptacles can have various combinations of 115 and 235 VAC power as discussed above in connection with the third embodiment 300.

Figure 13:
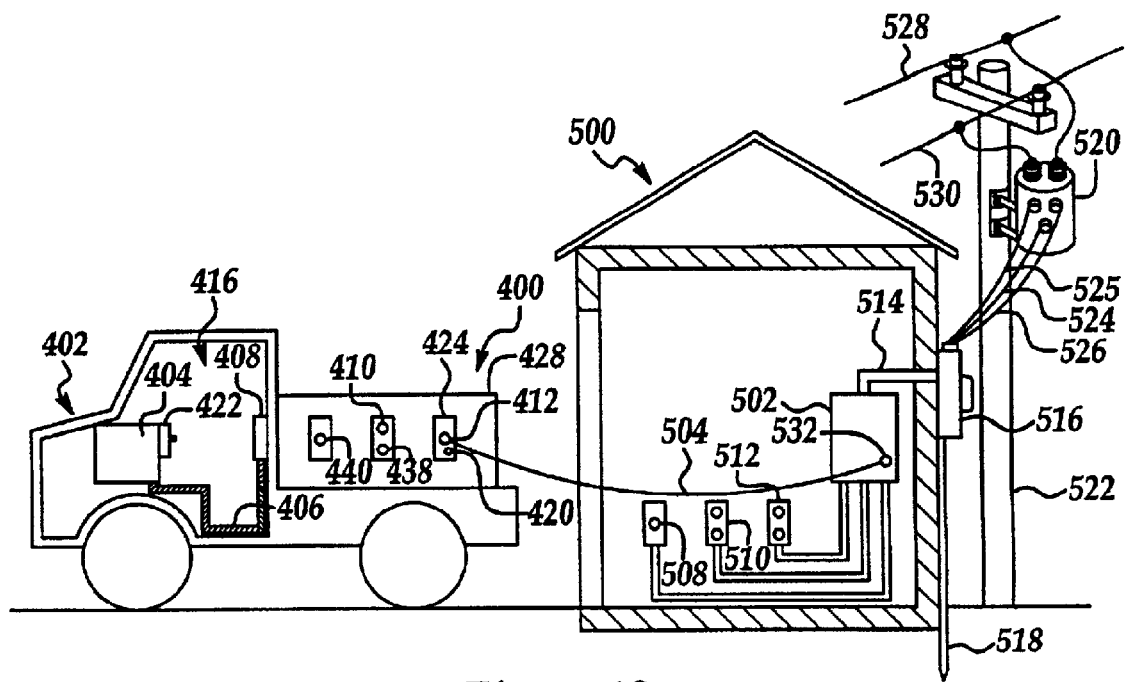
FIG. 13 illustrates the fourth embodiment as it might be used to supply backup electrical power to a residential house.

FIG. 13 shows the fourth embodiment 400 as it might be used in one configuration to provide back-up electric power to a house 500 during, for example, a local power blackout. It will be appreciated that, although the remaining discussion is directed towards use of the fourth embodiment 400, that the discussion applies to use of the first three embodiments as well. As shown in FIG. 13, the locking type receptacle 412 is connected by means of a suitable power cord 504 to a suitable interface 532 associated with the main circuit breaker box 502 of a house 500. The interface 532 may be implemented through a commercially available home interface unit where local building codes require it. This permits electric power to be supplied to the various different electrical loads that are plugged into the electrical system of the house 500.

More specifically, as shown, receptacles 508, 510, and 512 mounted within the wall of the house 500 are all electrically connected to the main circuit breaker box 502 (or the commercially available interface unit). The breaker box, in turn, is electrically connected via a power conduit 514 to a meter box 516 which itself is electrically connected to earth ground via an electrically conductive wire, pole, or stake 518. During typical times when there is no local power blackout, power from local utility power lines 528 and 530 is delivered to the meter box 516 (and, therefore, also to the breaker box 502) by way of a step-down transformer 520, mounted on a pole 522, that is directly electrically connected to the meter box 516 via outside phase lines 525 and 526 and a middle neutral line 524. This utility power is thus provided to the breaker box 502 for subsequent distribution to the various receptacles 508, 510, and 512. During times of blackout, however, the utility power lines leading into the breaker box 502 via power conduit 514 can be open-circuited (electrically isolated) using an appropriate breaker switch (not shown) or the commercially available interface unit so that an open circuit condition is created between the breaker box 502 and the power lines 528 and 530 before the system 400 is electrically interfaced with the breaker box 502. Thereafter, the switch 422A can be set to the proper (first) position to supply non-GFCI protected power to the breaker box. For applications other than residential whole-house backup where the load does not have a grounded neutral, the switch 422A can be switched to its second position and one of the other receptacles from the system 400 can be used. This might be done where, for example, power is needed at a construction site or where the mobile system is provided backup to one or more individual appliances such as a refrigerator or air conditioner.

Figure 14:
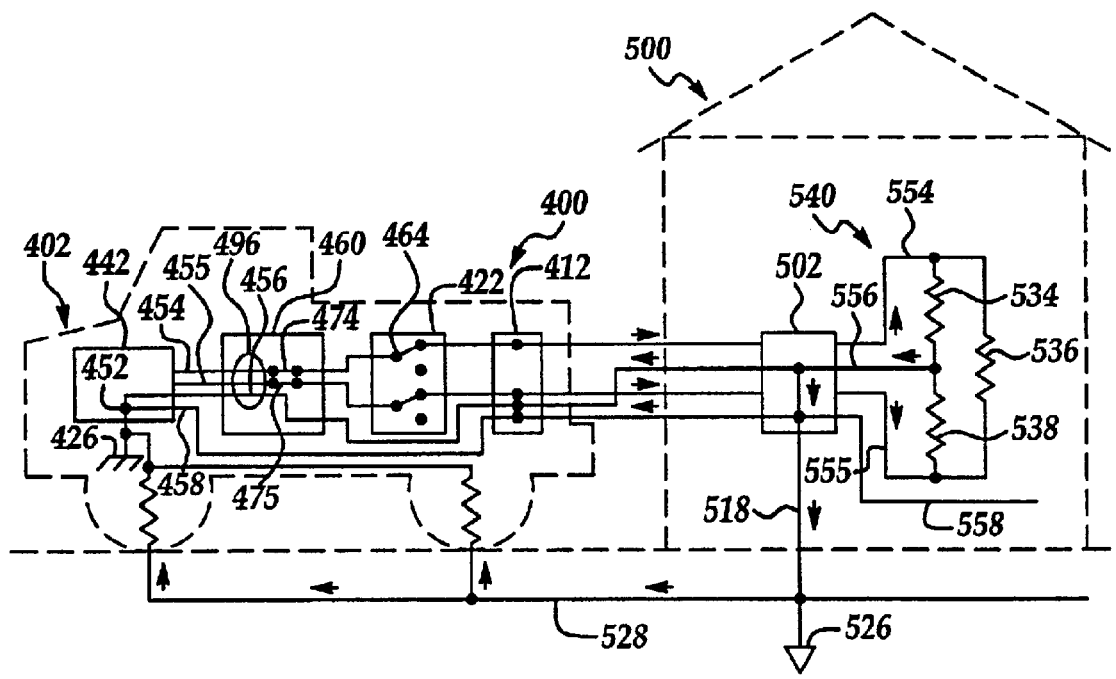
FIG. 14 is an electric circuit diagram of the mobile power supply system and house wiring shown in FIG. 13.

Referring now to FIG. 14, there is shown an electric circuit diagram of the mobile electric power supply system 400 as configured in FIG. 13. As shown in FIG. 14, the breaker box 502 or commercially available interface unit is electrically connected to various different electrical loads 534, 536, and 538 that are plugged into the electrical system 540 of the house 500. The hot power lines 554 and 555 of the house electrical system 540 are connected to the respective power lines 454 and 455 of the system 400 at the breaker box 502. In addition, a neutral line 556 and a local house ground line 558 of the house electrical system 540 are connected within the breaker box 502 to both the neutral and ground lines 456 and 458 of the system 400. Both internal circuit nodes within box 502 are, in turn, electrically connected (i.e., shorted) to earth ground 526 via the electrically conductive stake 518. Within such configuration, arrows representing the flow of electric current therein as particularly illustrated in FIG. 14 serve to demonstrate why the GFCI 460 of the system 400 should be electrically disabled to thereby successfully prevent nuisance tripping when the system 400 is providing backup power to the house. In particular, since the neutral conductor 556 of the house electrical system 540 is purposely electrically connected to earth ground 526, some of the AC current returning to the electric power source 442 may be diverted from returning via the neutral line 456 and can instead return via the ground conductor 458 or along an electrically conductive earth ground path 528.

As used in herein, the terms "coupled" and "connected" refer to either a direct or indirect connection so that, for example, in the first embodiment 100 the switch 122 is coupled or connected to both the power source 142 and the receptacle 112 even though it is directly connected to the receptacle, but is only connected to the power source by way of the GFCI 160. As another example, the switch utilized in each of the embodiments is coupled to the data input of the GFCI; however, in the first embodiment, it is indirectly connected to the GFCI 160 via the disable circuit 180, whereas in the second embodiment, it is directly connected.

It will thus be apparent that there has been provided in accordance with the present invention a mobile electric power supply system which achieves the aims and advantages specified herein. It will, of course, be understood that the foregoing description is of preferred exemplary embodiments of the invention and that the invention is not limited to the specific embodiments shown. Various changes and modifications will become apparent to those skilled in the art. For example, although the illustrated embodiments have been directed to use of the invention as a part of an automotive vehicle, the mobile system can instead be implemented as, for example, a portable generator or wheeled trailer. All such variations and modifications are intended to come within the scope of the appended claims.

What is claimed is:

1. A mobile system for supplying electric power to an electrical load, comprising:
   a vehicle;
   an electric power source in said vehicle comprising a battery;
   a first receptacle electrically coupled to said electric power source via a plurality of power line conductors;
   a second receptacle electrically coupled to said electric power source via said power line conductors;
   a ground fault circuit interrupter electrically connected to said power line conductors, said ground fault circuit interrupter having an output for providing a trip signal used by the mobile system to interrupt current flow over said power line conductors to thereby provide ground fault protection of said second receptacle against a current imbalance in said power line conductors;

a switch device electrically coupled between said electric power source and said first and second receptacles, with said switch device being connected in series with said ground fault circuit interrupter such that current flowing through said ground fault circuit interrupter flows through said switch device;

wherein said switch device can be switched between a first state, in which said first receptacle receives power from said electric power source that is unprotected by said ground fault circuit interrupter, and a second state, in which said second receptacle receives power from said electric power source that is protected by said ground fault circuit interrupter against a current imbalance in said power line conductors.

2. The mobile system of claim 1, wherein said power line conductors provide alternating-current electrical power and include a neutral conductor.

3. The mobile system of claim 2, wherein said power line conductors comprise said neutral conductor and a single 115 VAC conductor, whereby said electric power source supplies single phase power.

4. The mobile system of claim 2, wherein said power line conductors comprise said neutral conductor and two 115 VAC conductors, each of which are 180 degrees out of phase with the other, whereby said electric power source supplies two-phase power.

5. The mobile system of claim 2, wherein said electric power source includes a ground, and wherein said first receptacle is designated for and capable of electrically interfacing with a first type electrical load having a grounded neutral conductor, and said second receptacle is designated for and capable of electrically interfacing with a second type electrical load having an ungrounded neutral conductor.

6. The mobile system of claim 2, wherein said switch device is connected in series with all of said power line conductors except said neutral conductor, and wherein said switch device switches alternating-current power to only one of said first and second receptacles at a time.

7. The mobile system of claim 2, wherein said ground fault circuit interrupter includes a circuit breaker element that is connected in series with said switch device such that current flowing through said circuit breaker element flows through said switch device, said circuit breaker element being capable of open-circuiting at least one of said power line conductors in response to said trip signal.

8. The mobile system of claim 2, wherein said ground fault circuit interrupter includes a control circuit that can be selectively enabled or disabled by said switch device and that, when enabled, produces the trip signal on said output in response to a current imbalance between said power line conductors.

9. The mobile system of claim 8, wherein said control circuit includes a data input coupled to said switch device, wherein said control circuit can be selectively enabled or disabled via said data input based on the state of said switch device; and wherein, when said switch device is placed in a first state, said control circuit is disabled via said data input with said first receptacle being electrically connected to said power line conductors and said second receptacle being electrically isolated from at least one of said power line conductors, and, when said switch device is placed into a second state, said control circuit is able to produce the trip signal on said output in response to a current imbalance between said power line conductors, with said first receptacle being electrically isolated from at least one of said power line conductors and said second receptacle being electrically connected to said power line conductors.

10. The mobile system of claim 9, wherein said mobile system further comprises a disable circuit coupled between said switch device and said data input, said disable circuit being operable to disable said control circuit via said data input when said first receptacle is powered via said switch device.

11. The mobile system of claim 2, wherein said switch device comprises a manually activated switch connected in series with at least one of said power line conductors.

12. The mobile system of claim 2, wherein said switch device comprises a manually activated switch and a relay connected to at least one of said power line conductors and both said first and second receptacles, with said relay including normally open contacts connected to one of said first and second receptacles and normally closed contacts connected to the other of said first and second receptacles, and including a coil that can be selectively energized using said switch to thereby switch power from said power line conductors to one or the other of said first and second receptacles.

13. The mobile system of claim 2, wherein said electric power source further comprises:

an electronic power conversion circuit electrically coupled to said at least one battery, wherein said electronic power conversion circuit is capable of converting the direct-current electric power into the alternating-current electric power supplied by said power line conductors.

14. The mobile system of claim 13, wherein said output of said ground fault circuit interrupter is connected to said electric power conversion circuit, and wherein said trip signal is used by said electric power conversion circuit to disable itself from supplying alternating-current electric power to said power line conductors.

15. The mobile system of claim 2, further comprising an automotive vehicle, wherein said electric power source, said ground fault circuit interrupter, said switch device, and said first and second receptacles are situated onboard said automotive vehicle.

16. The mobile system of claim 15, wherein said electric power source and said ground fault circuit interrupter are located in close proximity together on said vehicle, and wherein at least one of said receptacles is located on said vehicle remotely from said electric power source and said ground fault circuit interrupter.

17. The mobile system of claim 15, wherein said vehicle includes an enclosed cabin space and said mobile system further comprises a third receptacle coupled to said electric power source via said ground fault circuit interrupter and said switch device to receive power from said electric power source; and wherein said first and second receptacles are located outside said cabin space.

18. A mobile system for supplying electric power to an electrical load, comprising:

a vehicle having an internal combustion engine;

an electric power source in said vehicle comprising at least one battery and a power inverter receiving power via a generator from said internal combustion engine;

at least two line conductors connected to said electric power source;

a ground fault circuit interrupter electrically connected to said line conductors and capable of interrupting current flow through said conductors in response to a current imbalance between said conductors;

a first receptacle designated for and capable of electrically interfacing with a first type electrical load having a grounded neutral conductor;

a second receptacle designated for and capable of electrically interfacing with a second type electrical load having an ungrounded neutral conductor; and a switch device connected in series with said ground fault circuit interrupter between said electric power source and said first and second receptacles such that power from said electric power source is provided to only one of said first and second receptacles at a time;

wherein said switch device is capable of electrically switching said electric power source between said first and second receptacles and wherein said second receptacle is protected by said ground fault circuit interrupter against a current imbalance between said conductors and said first receptacle is unprotected by said ground fault circuit interrupter.

19. The mobile system defined in claim 18, wherein said electric power source and said ground fault circuit interrupter are located in close proximity together on said vehicle, and wherein at least one of said receptacles is located on said vehicle remotely from said electric power source and said ground fault circuit interrupter.

20. The mobile system defined in claim 18, wherein said vehicle includes an enclosed cabin space and said mobile system further comprises a third receptacle coupled to said electric power source via said ground fault circuit interrupter and said switch device to receive power from said electric power source; and wherein said first and second receptacles are located outside said cabin space.

21. The mobile system defined in claim 18, wherein said switch device is electrically connected in series between said ground fault circuit interrupter and said first and second receptacles such that power supplied to said first and second receptacles passes through said ground fault circuit interrupter, and wherein said ground fault circuit interrupter is disabled whenever power from said electric power source is supplied to said first receptacle.

22. The mobile system defined in claim 21, wherein said ground fault circuit interrupter includes a data input and can be selectively disabled via said data input, and wherein said mobile system further comprises a disable circuit coupled between said switch device and said data input, said disable circuit being operable to disable said ground fault circuit interrupter via said data input when said first receptacle is powered via said switch device.

23. The mobile system defined in claim 21, wherein said switch device includes a manually activated switch that can be moved between a first position, in which said first receptacle is connected via said ground fault interrupter circuit to said electric power source, and a second position, in which said second receptacle is connected via said ground fault interrupter circuit to said electric power source.

24. The mobile system defined in claim 21, wherein said switch device comprises:

a relay connected in circuit between said ground fault circuit interrupter and said first and second receptacles; and a manually activated switch that can be moved between first and second positions, said manually activated switch being coupled to said ground fault circuit interrupter and said relay;

wherein, when said switch is in said first position, said ground fault circuit interrupter is disabled and said first receptacle receives power from said electric power source via said ground fault circuit interrupter and said relay, and, when said switch is in said second position, said ground fault circuit interrupter is enabled and said second receptacle receives power from said electric power source via said ground fault circuit interrupter and said relay.

25. The mobile system defined in claim 21, further comprising an indicator circuit electrically coupled to said switch device and being capable of providing a visual indication when said ground fault circuit interrupter is disabled.

26. The mobile system defined in claim 18, wherein said electric power source comprises:

at least one battery capable of providing direct-current electric power; and an electronic power conversion circuit electrically coupled to said at least one battery, wherein said electronic power conversion circuit is capable of converting the direct-current electric power into alternating-current electric power.

27. The mobile system defined in claim 26, wherein said ground fault circuit interrupter has an output connected to said electric power conversion circuit, and wherein said ground fault circuit interrupter is capable of supplying a trip signal on said output in response to a current imbalance on said line conductors, with said trip signal being used by said electric power conversion circuit to disable itself from supplying alternating-current electric power to said line conductors.

28. The mobile system defined in claim 18, wherein said electric power source further comprises:

a phase line conductor; and a neutral line conductor;

wherein said phase line and neutral line conductors supply alternating-current electric power to said first receptacle via said switch device when said switch device is in a first state and to said second receptacle via said switch device and said ground fault circuit interrupter when said switch device is in a second state.

29. The mobile system defined in claim 28, wherein said switch device is electrically connected in series between said ground fault circuit interrupter and said first and second receptacles such that said phase line and neutral line conductors supply alternating-current electric power to said first receptacle via both said switch device and said ground fault circuit interrupter.

30. The mobile system defined in claim 28, wherein said switch device includes a single-pole, double-throw type configuration having two fixed contacts, each coupled to one of said first and second receptacles, and a movable contact that is coupled to said phase line conductor.

31. The mobile system defined in claim 28, wherein said switch device comprises:

a relay that includes a coil, two fixed contacts with each coupled to one of said first and second receptacles, and a movable contact that is coupled to said phase line conductor; and a manually activated switch electrically coupled to said coil;

wherein said movable contact moves between said fixed contacts upon energization of said coil; and wherein said manually activated switch controls operation of said coil.

32. The mobile system defined in claim 28, wherein said phase line conductor comprises a first phase line conductor and wherein said electric power source further comprises a second phase line conductor which supplies alternating-current electric power that is 180 degrees out of phase with the alternating-current electric power supplied by said first phase line conductor; and wherein said first receptacle is one of a first plurality of receptacles designated for and capable of electrically interfacing with the first type electrical load having a grounded neutral conductor;

wherein said second receptacle is one of a second plurality of receptacles designated for and capable of electrically interfacing with the second type electrical load having an ungrounded neutral conductor;

wherein said first phase line conductor supplies alternating-current electric power via said switch device to at least one of said receptacles when said switch device is in a first state and to at least one other of said receptacles when said switch device is in a second state; and wherein said second phase line conductor supplies alternating-current electric power via said switch device to at least one of said receptacles when said switch device is in the first state and to at least one other of said receptacles when said switch device is in the second state.

33. The mobile system defined in claim 32, wherein said switch device includes a double-pole, double-throw configuration having:

a first set of contacts that includes two fixed contacts, each coupled to at least one of said receptacles, and a movable contact that is coupled to said first phase line conductor; and a second set of contacts that includes two fixed contacts, each coupled to at least one of said receptacles, and a movable contact that is coupled to said second phase line conductor.

34. The mobile system defined in claim 32, wherein said switch device comprises:

a relay that includes:
a first set of contacts that includes two fixed contacts, each coupled to at least one of said receptacles, and a movable contact that is coupled to said first phase line conductor; and a second set of contacts that includes two fixed contacts, each coupled to at least one of said receptacles, and a movable contact that is coupled to said second phase line conductor; and a coil that causes movement of said movable contacts upon energization of said coil; and a manually activated switch electrically coupled to said coil;

wherein said manually activated switch controls operation of said coil.

35. The mobile system defined in claim 19, wherein said ground fault circuit interrupter is incorporated into said electric power source.

* * * * *